United States Patent
Pan

(10) Patent No.: US 11,394,127 B2
(45) Date of Patent: Jul. 19, 2022

(54) MM-WAVE MULTIPLE-INPUT MULTIPLE-OUTPUT ANTENNA SYSTEM WITH POLARIZATION DIVERSITY

(71) Applicant: Intel Corporation, Santa Clara, CA (US)

(72) Inventor: Helen K. Pan, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 16/157,232

(22) Filed: Oct. 11, 2018

(65) Prior Publication Data

US 2019/0044250 A1 Feb. 7, 2019

Related U.S. Application Data

(63) Continuation of application No. 13/993,510, filed as application No. PCT/US2011/061276 on Nov. 17, 2011, now Pat. No. 10,116,065.

(Continued)

(51) Int. Cl.
*H01Q 3/00* (2006.01)
*H01Q 21/24* (2006.01)
(Continued)

(52) U.S. Cl.
CPC ............ *H01Q 21/24* (2013.01); *H01Q 21/067* (2013.01); *H01Q 25/00* (2013.01); *H01P 11/001* (2013.01);
(Continued)

(58) Field of Classification Search
CPC ............ H01Q 21/067; H01Q 21/0087; H01Q 21/064; H01Q 21/24; H01Q 1/20;
(Continued)

(56) References Cited

U.S. PATENT DOCUMENTS 3,854,140 A 12/1974 Ranghelli et al.
5,315,309 A 5/1994 Rudow et al.
(Continued)

FOREIGN PATENT DOCUMENTS

CN 1977424 6/2007
CN 101316130 12/2008
(Continued)

OTHER PUBLICATIONS

"Chinese Application Serial No. 201810155344.8, Office Action dated Mar. 30, 2020", w English Translation, 24 pgs.
(Continued)

*Primary Examiner* — Chuong P Nguyen
(74) *Attorney, Agent, or Firm* — Schwegman Lundberg & Woessner, P.A.

(57) ABSTRACT

A system according to one embodiment includes a first antenna element configured to communicate a first signal, the first signal polarized in a first orientation; a second antenna element co-located with the first antenna element, the second antenna element configured to communicate a second signal, the second signal polarized in a second orientation, the second orientation orthogonal to the first orientation; and driver circuitry coupled to the first antenna element and the second antenna element, the driver circuitry configured to process the first signal and the second signal to achieve signal diversity in a wireless communication link.

18 Claims, 6 Drawing Sheets

Related U.S. Application Data

(60) Provisional application No. 61/452,754, filed on Mar. 15, 2011.

(51) Int. Cl.
*H01Q 21/06* (2006.01)
*H01Q 25/00* (2006.01)
*H01Q 1/20* (2006.01)
*H01Q 1/22* (2006.01)
*H01Q 13/08* (2006.01)
*H01Q 13/16* (2006.01)
*H01P 11/00* (2006.01)
*H01Q 7/00* (2006.01)
*H01Q 3/34* (2006.01)
*H01Q 21/00* (2006.01)
*H01Q 3/36* (2006.01)
*H04B 7/0413* (2017.01)
*H04B 7/10* (2017.01)

(52) U.S. Cl.
CPC ............ *H01Q 1/20* (2013.01); *H01Q 1/2266* (2013.01); *H01Q 1/2291* (2013.01); *H01Q 3/34* (2013.01); *H01Q 3/36* (2013.01); *H01Q 7/00* (2013.01); *H01Q 13/085* (2013.01); *H01Q 13/16* (2013.01); *H01Q 21/0087* (2013.01); *H01Q 21/064* (2013.01); *H04B 7/0413* (2013.01); *H04B 7/10* (2013.01); *H05K 999/99* (2013.01); *Y10T 29/49016* (2015.01); *Y10T 29/49018* (2015.01)

(58) Field of Classification Search
CPC ...... H01Q 1/2266; H01Q 1/2291; H01Q 3/34; H01Q 3/36; H01Q 3/22; H01Q 25/00; H01Q 25/001; H04B 7/0413; H04B 7/10
USPC ......................................... 342/372, 359, 361
See application file for complete search history.

(56) References Cited

U.S. PATENT DOCUMENTS

| | | | |
|---|---|---|---|
| 5,661,494 A | 8/1997 | Bondyopadhyay et al. | |
| 5,923,296 A | 7/1999 | Sanzgiri et al. | |
| 5,966,102 A * | 10/1999 | Runyon | H01Q 1/246 343/797 |
| 6,078,297 A | 6/2000 | Kormanyos et al. | |
| 6,448,933 B1 | 9/2002 | Hill et al. | |
| 6,459,414 B1 * | 10/2002 | Levis | H01Q 1/38 343/780 |
| 6,593,876 B2 | 7/2003 | Shuch | |
| 6,870,515 B2 * | 3/2005 | Kitchener | H04B 7/0417 342/361 |
| 7,310,379 B2 * | 12/2007 | Sibecas | H01Q 21/24 375/267 |
| 7,315,728 B2 | 1/2008 | Mimura et al. | |
| 7,333,455 B1 * | 2/2008 | Bolt | H04B 7/10 370/329 |
| 7,515,051 B2 | 4/2009 | Wagner et al. | |
| 7,646,343 B2 * | 1/2010 | Shtrom | H01Q 9/16 343/700 MS |
| 7,675,474 B2 * | 3/2010 | Shtrom | H01Q 3/242 455/101 |
| 7,852,276 B2 | 12/2010 | Apostolos et al. | |
| 8,212,732 B2 * | 7/2012 | Petersson | H01Q 13/106 343/770 |
| 8,228,231 B2 | 7/2012 | Ono et al. | |
| 8,253,625 B2 * | 8/2012 | Kim | H01Q 3/30 342/373 |
| 8,289,218 B2 | 10/2012 | Payne | |
| 8,295,772 B2 * | 10/2012 | Petersson | H04B 7/10 455/63.1 |
| 8,325,101 B2 | 12/2012 | Payne et al. | |
| 8,354,972 B2 | 1/2013 | Borja et al. | |
| 8,934,562 B2 * | 1/2015 | Chang | H04B 7/0413 375/267 |
| 9,042,276 B1 * | 5/2015 | Harel | H04B 7/0617 370/278 |
| 9,285,461 B2 * | 3/2016 | Swirhun | G01S 7/03 |
| 9,577,346 B2 * | 2/2017 | Shtrom | H01Q 13/10 |
| 9,859,614 B2 | 1/2018 | Almog et al. | |
| 9,929,886 B2 * | 3/2018 | Amadjikpe | H01Q 9/0407 |
| 10,050,681 B2 * | 8/2018 | Kim | H04B 7/088 |
| 10,084,241 B1 * | 9/2018 | Jenwatanavet | H01Q 1/38 |
| 10,116,065 B2 | 10/2018 | Pan | |
| 10,425,145 B2 * | 9/2019 | Kim | H04B 7/022 |
| 10,727,580 B2 * | 7/2020 | Rajagopalan | H01Q 9/045 |
| 10,804,990 B2 * | 10/2020 | Kakishima | H04B 7/0478 |
| 2004/0157645 A1 * | 8/2004 | Smith | H01Q 1/246 455/562.1 |
| 2004/0192233 A1 | 9/2004 | Mitzlaff | |
| 2006/0105730 A1 | 5/2006 | Modonesi et al. | |
| 2006/0273959 A1 | 12/2006 | Kawasaki | |
| 2008/0129594 A1 * | 6/2008 | Pera | H01Q 9/0435 342/361 |
| 2008/0232502 A1 | 9/2008 | Wild et al. | |
| 2009/0034643 A1 | 2/2009 | Ahn et al. | |
| 2009/0197544 A1 * | 8/2009 | Petersson | H04B 7/10 455/73 |
| 2010/0265998 A1 | 10/2010 | Nakada et al. | |
| 2013/0115886 A1 | 5/2013 | Khan et al. | |
| 2015/0002349 A1 | 1/2015 | Peng et al. | |
| 2015/0091759 A1 | 4/2015 | Akhoondzadehasl et al. | |
| 2015/0214633 A1 | 7/2015 | Pan | |
| 2015/0215013 A1 * | 7/2015 | Strong | H04B 7/0452 370/336 |
| 2017/0288758 A1 * | 10/2017 | Kakishima | H04L 5/0014 |
| 2019/0267709 A1 * | 8/2019 | Mow | H01Q 9/045 |
| 2019/0273326 A1 * | 9/2019 | Sanford | H01Q 9/0428 |
| 2020/0091608 A1 * | 3/2020 | Alpman | H01Q 25/001 |
| 2020/0106473 A1 * | 4/2020 | Rong | H04L 25/02 |
| 2021/0028559 A1 * | 1/2021 | Hwang | H01Q 21/24 |

FOREIGN PATENT DOCUMENTS

| | | |
|---|---|---|
| CN | 101546868 A | 9/2009 |
| CN | 101728626 | 6/2010 |
| CN | 101728626 A | 6/2010 |
| CN | 102842769 | 12/2012 |
| CN | 108390161 | 8/2018 |
| EP | 2686907 | 1/2014 |
| JP | H056626 | 1/1993 |
| JP | 10209750 A | 8/1998 |
| JP | 2006-109351 A | 4/2006 |
| JP | 2006325033 | 11/2006 |
| JP | 2010-056626 A | 3/2010 |
| JP | 2010-098411 A | 4/2010 |
| JP | 2010520691 | 6/2010 |
| JP | 2010209750 | 9/2010 |
| JP | 2010239614 | 10/2010 |
| JP | 2012231446 | 11/2012 |
| WO | 2005069509 | 7/2005 |
| WO | 2006-055267 A1 | 5/2006 |
| WO | 2012125190 | 9/2012 |

OTHER PUBLICATIONS

International Search Report and Written Opinion received for PCT Application No. PCT/US2011/061276, dated Jul. 9, 2012, 9 Pages.

Office Action received for Japanese Patent Application No. 2012-010984, dated Mar. 5, 2013, 12 pages.

Office Action received for Japanese Patent Application No. 2012-010984, dated Jul. 23, 2013.

International Preliminary Report on Patentability received for PCT Patent Application No. PCT/US2011/061276, dated Sep. 26, 2013, 6 pages.

Office action received for Japanese Patent Application No. 2012-010984, dated Nov. 26, 2013.

(56) References Cited

OTHER PUBLICATIONS

Office Action received for Chinese Patent Application No. 201210078939.0, dated Apr. 2, 2014, 9 pages of English Translation and 6 pages Chinese Office Action.
Office Action received for Chinese Patent Application No. 201210078939.0, dated Jun. 24, 2015.
Office Action received for Chinese Patent Application No. 201210078939.0, dated Jan. 19, 2016.
Chinese Office Action/Reexamination Notice issued in Chinese Application No. 201210078939.0, dated Sep. 28, 2016, with English translation, 18 pages.
Chinese Office Action issued in Chinese Application No. 201210078939.0, dated Feb. 28, 2017, with English translation, 18 pages.
Chinese Notice of Reexamination issued in Chinese Application No. 201210078939.0, dated Jul. 14, 2017, with English translation, 7 pages.
Chinese Office Action/Decision on Reexamination issued in Chinese Application No. 201210078939.0, dated Nov. 24, 2017, with English translation, 6 pages.
"Chinese Application Serial No. 201810155344.8, Response filed Aug. 14, 2020 to Office Action dated Mar. 30, 2020", w English Claims, 13 pgs.
"Chinese Application Serial No. 201210078939.0, Office Action dated Dec. 22, 2014", 13 pgs.
"Chinese Application Serial No. 201210078939.0, Response filed Mar. 5, 2015 to Office Action dated Dec. 22, 2014", 14 pgs.
"U.S. Appl. No. 13/993,510, Restriction Requirement dated Aug. 31, 2017", 5 pgs.
"U.S. Appl. No. 13/993,510, Response filed Oct. 17, 2017 to Restriction Requirement dated Aug. 31, 2017", 9 pgs.
"U.S. Appl. No. 13/993,510, Non Final Office Action dated Nov. 16, 2017", 14 pgs.
"U.S. Appl. No. 13/993,510, Response filed Feb. 16, 2018 to Non Final Office Action dated Nov. 16, 2017", 13 pgs.
"U.S. Appl. No. 13/993,510, Notice of Allowance dated Jun. 27, 2018", 12 pgs.
"4Tx Codebook for UL SU-MIMO Rank 1 and 2", 3 GPP TSG-RAN WG1#57b R1-092402, (2009), 6 pgs.
"Japanese Application Serial No. 2012-010984, Decision of Refusal dated Jul. 4, 2014", W English Translation, 2 pgs.
"Japanese Application Serial No. 2012-010984, Response filed Jun. 5, 2013 to Office Action dated Feb. 27, 2013", W English Translation, 20 pgs.
"Japanese Application Serial No. 2012-010984, Response filed Aug. 29, 2013 to Office Action dated Jul. 16, 2013", W English Translation, 17 pgs.
"Chinese Application Serial No. 201810155344.8, Response filed Mar. 22, 2021 to Office Action dated Jan. 6, 2021", w English claims, 11 pgs.
"Chinese Application Serial No. 201810155344.8, Office Action dated Jan. 6, 2021", w English translation, 19 pgs.
"Chinese Application Serial No. 201810155344.8, Response filed Jul. 30, 2021 to Office Action dated May 7, 2021", w English claims, 9 pgs.

* cited by examiner

MM-WAVE MULTIPLE-INPUT MULTIPLE-OUTPUT ANTENNA SYSTEM WITH POLARIZATION DIVERSITY

CROSS-REFERENCE TO RELATED APPLICATIONS

The present application is a Continuation of U.S. patent application Ser. No. 13/993,510 filed Mar. 20, 2015, which is a National Stage Entry of PCT/US11/61276 filed Nov. 17, 2011, and claims the benefit of the filing date of U.S. Provisional Application Ser. No. 61/452,754, filed Mar. 15, 2011, the entire disclosures of which are incorporated herein by reference.

FIELD

The present disclosure relates to multiple-input multiple-output (MIMO) antenna systems, and more particularly, to millimeter-wave (MM-Wave) MIMO antenna systems with polarization diversity.

BACKGROUND

Electronic devices, such as laptops, notebooks, netbooks, personal digital assistants (PDAs) and mobile phones, for example, increasingly tend to include a variety of wireless communication capabilities. The wireless communication systems used by these devices are expanding into the higher frequency ranges of the communication spectrum, such as, for example, the millimeter wave region and, in particular, the unlicensed 5-7 GHz wide spectral band at 60 GHz. This expansion to higher frequencies is driven in part by the requirement for increased data rate communications used by applications such as high definition video, for example, that require multi-gigbit data rates.

MIMO antenna systems may be used to increase data throughput in wireless networks, however conventional MIMO antenna systems typically require separate antennas that are spaced apart by distances large enough to achieve the required isolation and spatial diversity between the antennas. Since propagation losses and attenuation tend to increase at these higher MM-Wave frequencies, it can become difficult to implement conventional MIMO antenna systems on the device platform due to the signal losses that are imposed over these increased distances.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
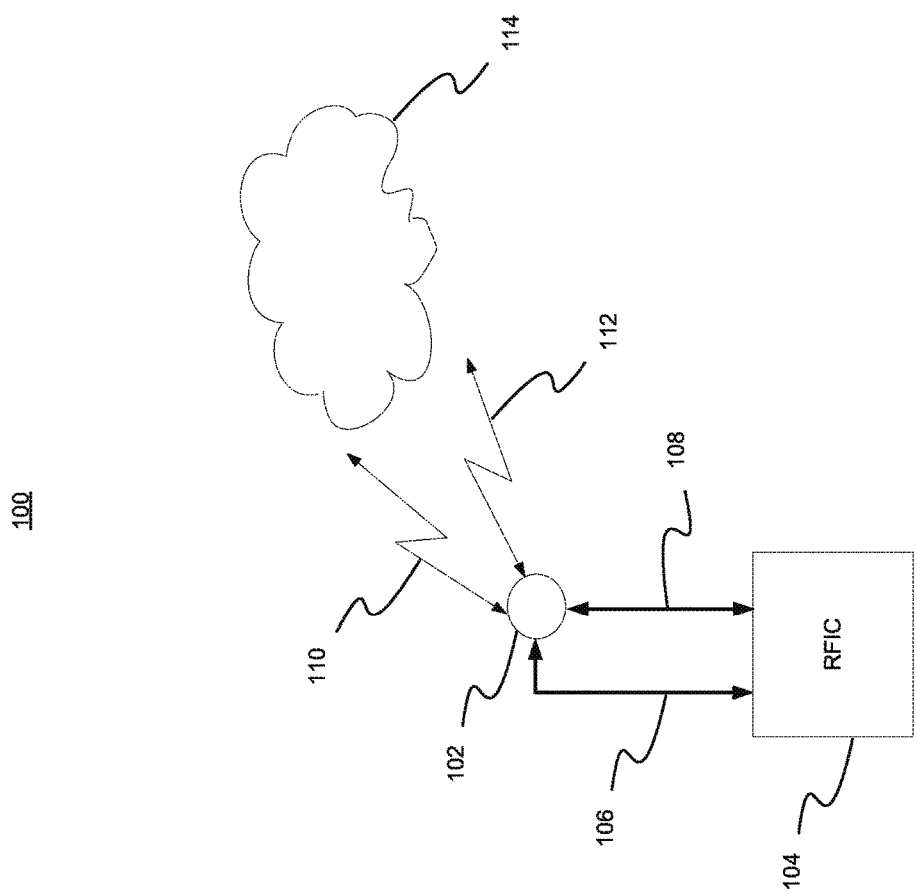
FIG. 1 illustrates a system diagram of one exemplary embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for an antenna to operate with the increased performance associated with MIMO capability, as will be explained in greater detail below, through the use of a dual polarization antenna element rather than multiple, spatially separated, antenna elements. The orthogonally polarized, horizontal and vertical channels of the dual polarization antenna element may have sufficient isolation to allow for 2×2 MIMO operation with the associated benefits of antenna diversity. The system may be configured to operate in the MM-Wave region of the RF spectrum and, in particular, the 60 GHz region associated with the use of wireless personal area network (WPAN) and wireless local area network (WLAN) communication systems. By eliminating the need for spatially separated antenna elements, the transmission path length from driver circuitry to antenna element may be reduced, which in turn reduces signal transmission losses that can be significant at MM-Wave frequencies.

In some embodiments, multiple dual polarization antenna elements may be configured into a phased array 2×2 MIMO antenna capable of simultaneous beam scanning in each MIMO channel.

The term Personal basic service set Control Point (PCP) as used herein, is defined as a station (STA) that operates as a control point of the mm-wave network.

The term access point (AP) as used herein, is defined as any entity that has STA functionality and provides access to the distribution services, via the wireless medium (WM) for associated STAs.

The term wireless network controller as used herein, is defined as a station that operates as a PCP and/or as an AP of the wireless network.

The term directional band (DBand) as used herein is defined as any frequency band wherein the Channel starting frequency is above 45 GHz.

The term DBand STA as used herein is defined as a STA whose radio transmitter is operating on a channel that is within the DBand.

The term personal basic service set (PBSS) as used herein is defined as a basic service set (BSS) which forms an ad hoc self-contained network, operates in the DBand, includes one PBSS control point (PCP), and in which access to a distribution system (DS) is not present but an intra-PBSS forwarding service is optionally present.

The term scheduled service period (SP) as used herein is scheduled by a quality of service (QoS) AP or a PCP. Scheduled SPs may start at fixed intervals of time, if desired.

The terms "traffic" and/or "traffic stream(s)" as used herein, are defined as a data flow and/or stream between wireless devices such as STAs. The term "session" as used herein is defined as state information kept or stored in a pair of stations that have an established a direct physical link (e.g., excludes forwarding); the state information may describe or define the session.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, WLAN stations, wireless personal network (WPAN), and the like.

Types of WPAN stations intended to be within the scope of the present invention include, although are not limited to, stations capable of operating as a multi-band stations, stations capable of operating as PCP, stations capable of operating as an AP, stations capable of operating as DBand stations, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing Wireless HD™ and/or Wireless-Gigabit-Alliance (WGA) specifications and/or future versions and/or derivatives thereof, devices and/or networks operating in accordance with existing IEEE 802.11 (IEEE 802.11-2007: Wireless LAN Medium Access Control (MAC) and Physical Layer (PHY) Specifications) standards and amendments ("the IEEE 802.11 standards"), IEEE 802.16 standards for Worldwide Interoperability for Microwave Access (WiMAX), Third Generation Partnership Project (3GPP) including Long Term Evolution (LTE) and Long Term Evolution Advanced (LTE-A) and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, Wireless Metropolitan Area Networks (WMAN), Wireless Wide Area Networks (WWAN), ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

FIG. 1 illustrates a system diagram 100 of one exemplary embodiment consistent with the present disclosure. Dual polarization antenna element 102 transmits and receives orthogonally polarized signals 110 and 112. Signals 110 and 112 may sometimes be referred to as being horizontally and vertically polarized, however these terms do not imply that the signals 110 and 112 are horizontal or vertical with respect to any particular reference coordinate system, but rather that they are orthogonal to one another. In some embodiments, orthogonally polarized signals 110 and 112 may be right-hand circularly polarized and left-hand circularly-polarized, respectively. Dual polarization antenna element 102 is coupled to driver circuitry 104, which is configured to provide signals 110 and 112 through transmission paths 106 and 108. The antenna system 100 thus provides separate channels for the horizontally and vertically polarized signals that, with sufficient electromagnetic isolation between the channels, allow the antenna system to operate as a 2×2 MIMO antenna, i.e., two inputs to the RF radio channel 114 and two outputs from the RF radio channel 114.

MIMO antennas offer improved communication performance with increased data rates and increased range by providing a second diverse path through the RF radio channel 114 which experiences independent fading characteristics from the first path. In a conventional MIMO antenna system this diversity is achieved by spatial separation of two antennas (for the case of 2×2 MIMO). In an embodiment consistent with the present disclosure, however, this diversity may be achieved through the use of dual polarization. This approach offers an advantage in that the horizontal and vertical polarization channels are co-located at a single antenna element 102. As used herein, the term "co-located" means that the two entities being described are located at substantially the same point in space, though not necessarily at exactly the same point in space. By eliminating the need for spatially separated antenna elements, the transmission path length from driver circuitry 104 to antenna element 102 may be reduced, which in turn reduces signal transmission losses that can be significant at MM-Wave frequencies.

In some embodiments, driver circuitry 104 may be a radio frequency integrated circuit (RFIC). Driver circuitry 104 and antenna element 102 may be configured to operate in the MM-Wave region of the RF spectrum and, in particular, the 60 GHz region associated with the use of wireless personal area network (WPAN) and wireless local area network (WLAN) communication systems. The electromagnetic isolation between the horizontal and vertical channels may equal or exceed 15 decibels (dB). This level of isolation may be achieved by increasing the distance between antenna element feed lines for the horizontal and vertical channels.

Figure 2:
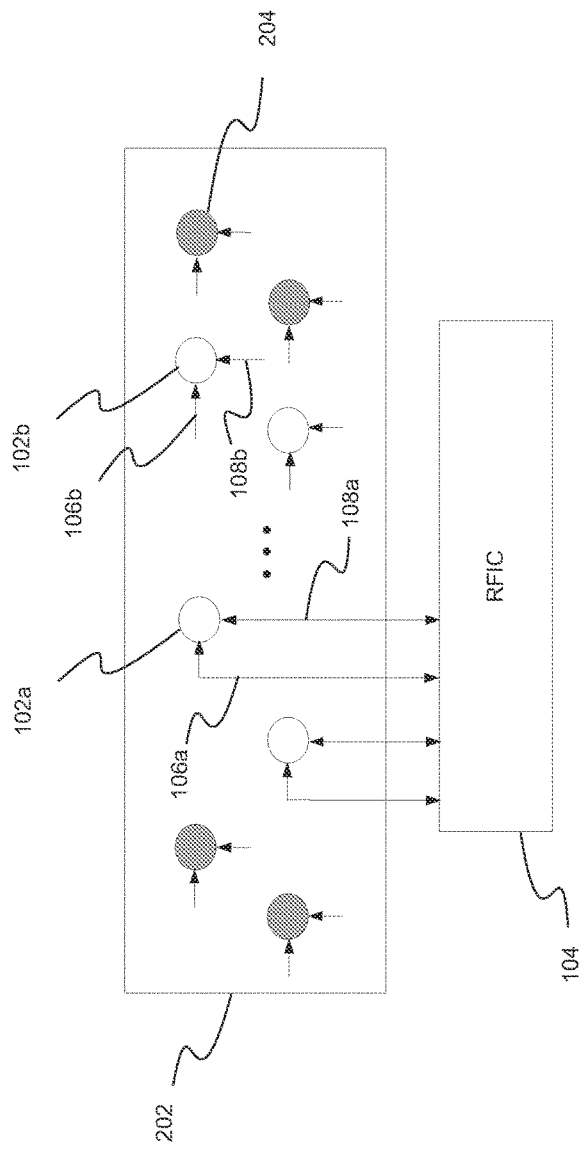
FIG. 2 illustrates a system diagram of another exemplary embodiment consistent with the present disclosure.

FIG. 2 illustrates a system diagram 200 of another exemplary embodiment consistent with the present disclosure. Multiple dual polarization antenna elements 102a, 102b, etc. may be configured into a phased array 2×2 MIMO antenna 202 capable of simultaneous beam scanning in each MIMO channel. Dual polarization antenna elements 102a, 102b, etc. are coupled to driver circuitry 104, which is configured to provide separate channels for the signals through transmission paths 106a and 108a for antenna element 102a, and transmission paths 106b and 108b for antenna element 102b, etc. The antenna system 200 thus provides separate horizontal and vertical channels to each of the antenna elements 102a, 102b, etc., and the signals on the horizontal channels may be independent of the signals on the vertical channels. The system may be configured to provide sufficient electromagnetic isolation between the channels to allow the antenna to operate as a 2×2 MIMO phased array antenna. The 2×2 MIMO phased array antenna system 200 is a capable of generating two independently scanned beams for both transmission and reception. The beam scanning is accomplished by controlling the phase delay associated with each of the polarizations of each of the antenna elements 102a, 102b, etc., as will be explained in greater detail below.

In some embodiments, the phased array antenna system 200 may comprise dummy antenna elements 204 at some or all of the edges of the phased array. The dummy antenna elements 204 may be termination load resistors that reduce reflections of the RF signal at the end of the transmission path by providing termination impedance that is matched to the characteristic impedance of the transmission line. This may increase the stability of the frequency and bandwidth properties of the phased array as it scans the beam through different angles.

Figure 3:
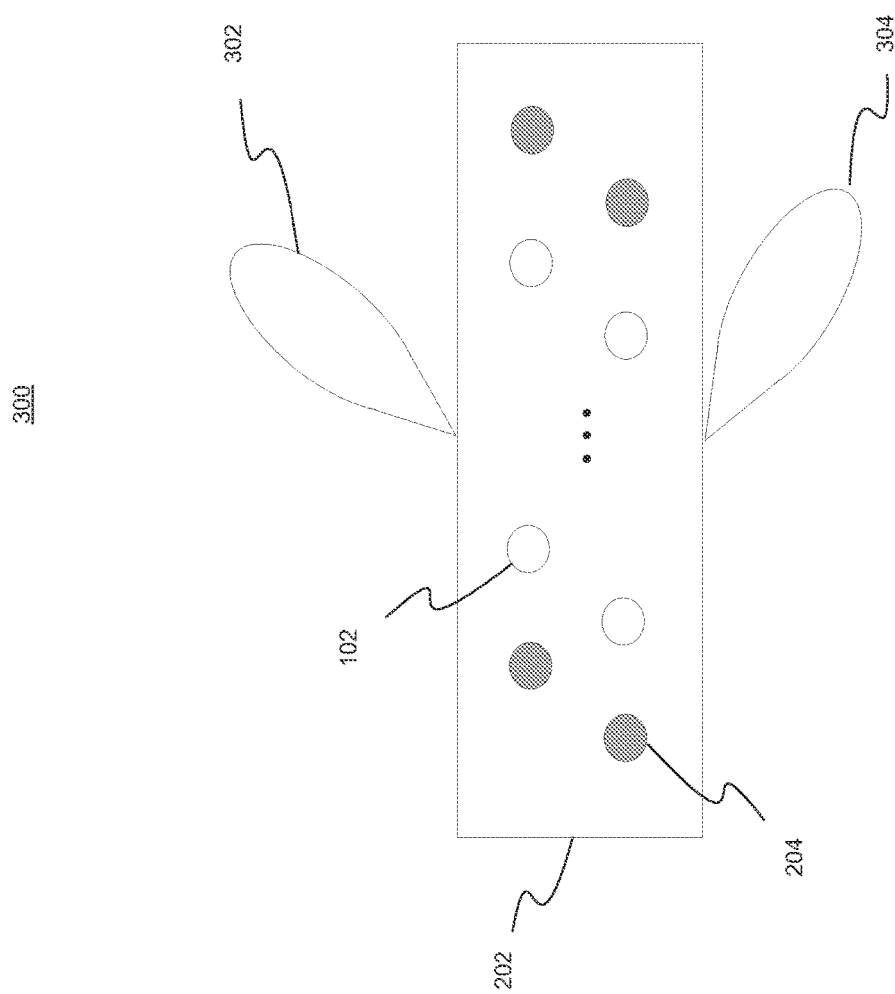
FIG. 3 illustrates a system diagram of another exemplary embodiment consistent with the present disclosure.

FIG. 3 illustrates a system diagram 300 of another exemplary embodiment consistent with the present disclosure. The phased array antenna system 200 is shown with independently scanned beams 302 and 304 generated by the horizontally and vertically polarized channels of the antenna elements 102 of the phased array antenna 202. The beams 302 and 304 are shown to be oriented in arbitrary directions and may in practice be scanned to any direction. In some cases the beams 302 and 304 may be pointed in the same direction. This may be useful when operating under line of sight conditions where the communication link is directed to a particular entity at a known location. Any suitable number of antenna elements may be employed in the phased array antenna 202. Generally the gain of the antenna 202 increases as the number of antenna elements 102 increase.

Figure 4:
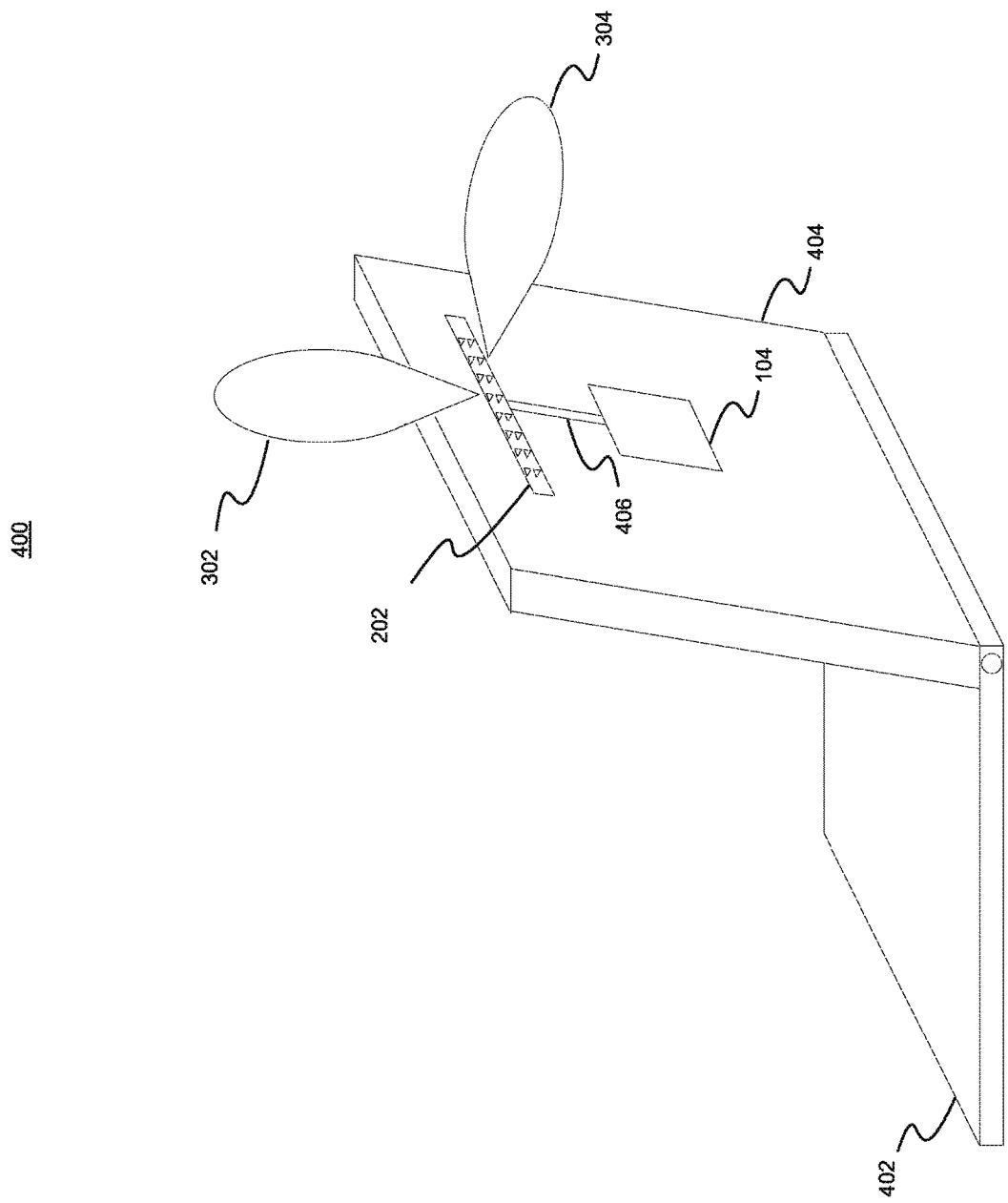
FIG. 4 illustrates a system diagram of another exemplary embodiment consistent with the present disclosure.

FIG. 4 illustrates a system diagram 400 of another exemplary embodiment consistent with the present disclosure. Antenna system 202 is shown deployed on a platform. Platform 402 is shown as a laptop computer in this illustration, but it may be any device including a notebook, tablet, netbook, personal digital assistant (PDA), mobile phone, smartphone, network hub or any device for which wireless communication capability may be desired. The antenna system 202 is located on the lid 404 of platform 402, but may be located at any suitable position on platform 402. In some embodiments, antenna system 202 may be disposed on interior surfaces or portions of platform 402. The antenna system 202 is shown to be coupled to RFIC 104 through electrical connections or transmission paths 406. Scanned beams 302 and 304 are also shown.

In some embodiments there may be multiple platforms 402 configured to communicate over a WWAN or WMAN. Each platform may operate as a radio thus providing network diversity.

Figure 5:
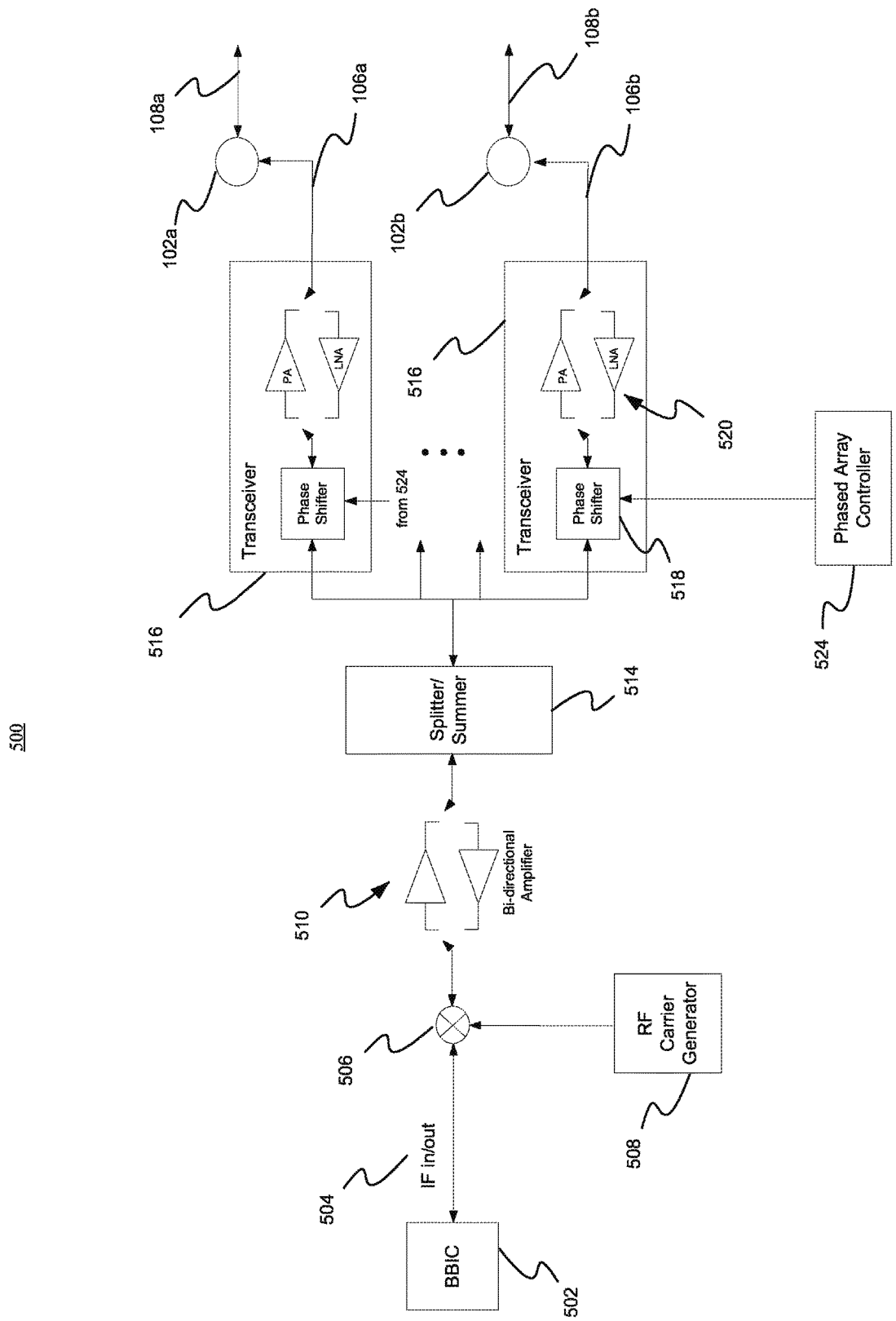
FIG. 5 illustrates a system block diagram of one exemplary embodiment consistent with the present disclosure.

FIG. 5 illustrates a system block diagram 500 of one exemplary embodiment consistent with the present disclosure. Shown are antenna elements 102a, 102b, etc, which may be configured as phased array antenna elements. A baseband integrated circuit (BBIC) module 502 may be a bidirectional circuit, configured to both transmit and receive. In the transmit direction, an IF signal 504 may be provided from BBIC 502. An RF carrier is generated by RF carrier generator 508 and mixed with IF signal 504 by mixer 506 to up-convert the IF signal 504 to an RF signal. Mixer 506 may be a passive bi-directional mixer. The RF signal may be amplified by bi-directional amplifier 510 and then coupled to a phased array antenna system. The phased array antenna system transmits the RF signal in a scanned beam pattern, the direction of which is adjustable. To accomplish this, the RF signal is split by splitter/summer 514 and fed to a plurality of transceivers 516. Each transceiver 516 is configured with a phase shifter 518 capable of independently adjusting the phase of the split RF signal being fed to that transceiver 516. The phase shifted RF signal is further amplified by power amplifier (PA) 520 and fed to the antenna element 102a, 102b, etc. associated with the particular transceiver 516.

The phase shifter 518 may be under the control of phased array controller 524, which controls the amount and timing of the phase shift adjustments for each transceiver 516. By independently adjusting the phase of each of the split RF signals transmitted through each antenna element 102a, 102b, a pattern of constructive and destructive interference may be generated between the antenna elements 102a, 102b that results in a beam pattern of a desired shape that can be steered to a particular direction. By varying the phase adjustments in real-time, the resultant transmit beam pattern can be scanned through a desired range of directions. In some embodiments the phased array controller 524 may be a general purpose processor, a digital signal processor (DSP), programmable logic or firmware.

A similar process may operate in the receive direction. Each antenna element 102a, 102b receives an RF signal which is processed by associated transceiver 516, where it is amplified by low noise amplifier (LNA) 520 and phase shifted by phase shifter 518 under control of phased array controller 524. The outputs of each transceiver 516 are summed by splitter/summer 514. Received RF signals arriving from different directions generally reach each of antenna elements 102a, 102b at different times. Phase shifting, which is equivalent to time shifting, may be employed to time align the received RF signals arriving from a particular direction while leaving received RF signals arriving from other directions unaligned. The summation of these RF signals by splitter/summer 514 results in a gain for the time-aligned components associated with signals arriving from that particular direction. This results in a beam pattern gain in that direction. By varying the phase adjustments in real-time, the resultant receive beam pattern can be scanned through a desired range of directions.

The received RF signal from the phased array antenna system may be further amplified by bi-directional amplifier 510 and then mixed by mixer 506 with the RF carrier generated by RF carrier generator 508 to down-convert the RF signal to an output IF signal 504 which is sent to BBIC 502 for baseband processing.

The process described above may, for example, handle the horizontally polarized signal through transmission paths 106a, 106b, etc. The same, or similar, process may also be performed independently and nearly simultaneously to handle the vertically polarized signal through transmission paths 108a, 108b, etc. Thus, each antenna element, 102a, 102b, etc. may be provided with independent phase delay for the horizontal and vertical channels to provide separate beam scanning for the horizontally and vertically polarized signals.

In some embodiments, the system is configured to operate on RF signals in the frequency range from 57-60 GHz and IF signals in the frequency range from 11.4-13.2 GHz. Baseband signals may be in the approximate range of 2 GHz.

Figure 6:
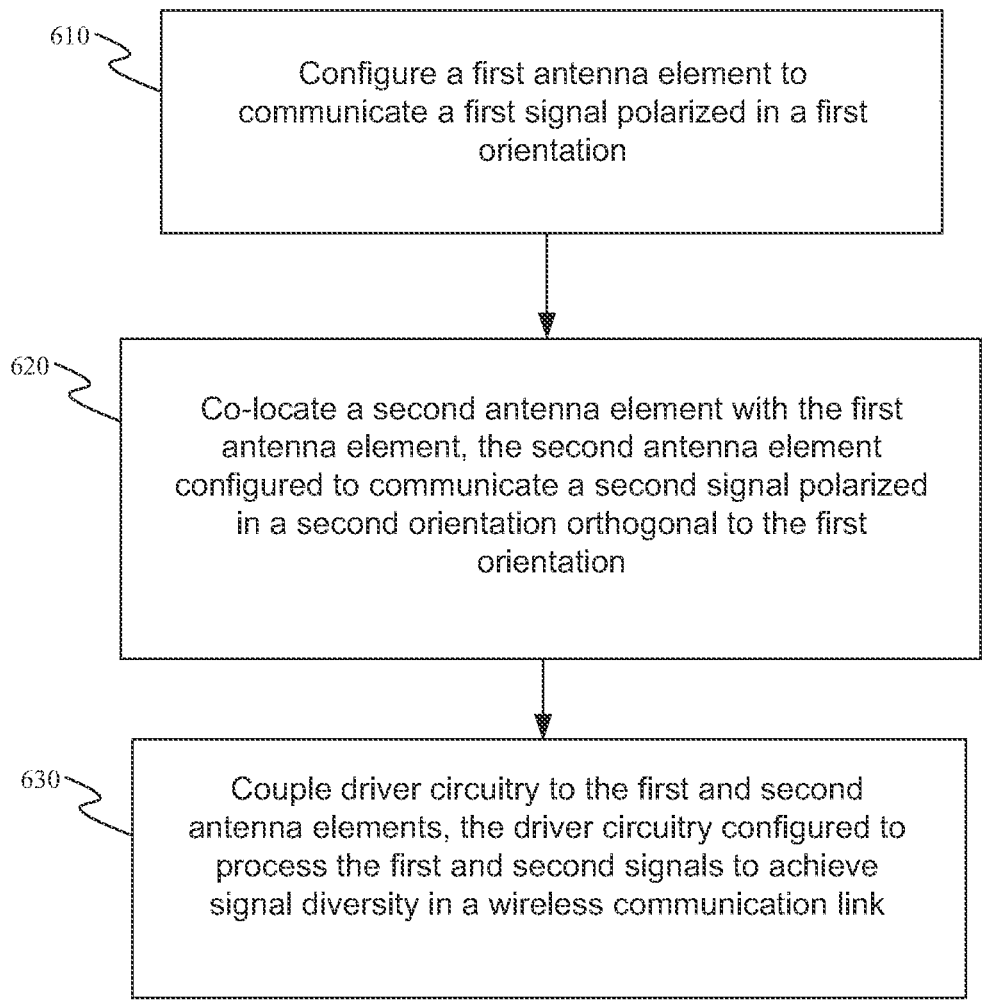
FIG. 6 illustrates a flowchart of operations of one exemplary embodiment consistent with the present disclosure.

FIG. 6 illustrates a flowchart of operations 600 of one exemplary embodiment consistent with the present disclosure. At operation 610, a first antenna element is configured to communicate a first signal polarized in a first orientation. At operation 620, a second antenna element is co-located with the first antenna element. The second antenna element is configured to communicate a second signal polarized in a second orientation orthogonal to the first orientation. At operation 630, driver circuitry is coupled to the first and second antenna elements. The driver circuitry is configured to process the first and second signals to achieve signal diversity in a wireless communication link.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all sub-combinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hard-wired circuitry, programmable circuitry, state machine circuitry, and/or firmware that stores instructions executed by programmable circuitry. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A millimeter-wave antenna system, comprising:
a dual polarization antenna comprising first and second co-located antenna elements configured to transmit and receive horizontally polarized signals and vertically polarized signals, the first co-located antenna element configured to transmit and receive the horizontally polarized signals, the second co-located antenna element configured to transmit and receive the vertically polarized signals, the first and second co-located antenna elements positioned without spatial separation therebetween;
driver circuitry coupled to the dual polarization antenna to provide the horizontally polarized signals and the vertically polarized signals to the dual polarization antenna;
a first transmission path between the driver circuitry and the dual polarization antenna to provide the vertically polarized signals between the driver circuitry and the second co-located antenna element; and
a second transmission path between the driver circuitry and the dual polarization antenna to provide the horizontally polarized signals between the driver circuitry and the first co-located antenna element,
wherein the horizontally polarized signals and the vertically polarized signals comprise millimeter-wave frequencies, and
wherein the first and second transmission paths are electromagnetically isolated at the millimeter-wave frequencies.

2. The antenna system of claim 1, wherein the dual polarization antenna is to concurrently transmit the horizontally polarized signals and the vertically polarized signals to enable multiple input multiple output ("MEMO") operation, and
wherein the first and second transmission paths are separated to achieve a minimum electromagnetic isolation at the millimeter-wave frequencies for the AMMO operation.

3. The antenna system of claim 1, wherein the horizontally polarized signals and the vertically polarized signals are orthogonal to each other, and
wherein the first and second transmission paths are electromagnetically isolated by at least 15 dB at the millimeter-wave frequencies.

4. The antenna system of claim 1, further comprising a wireless station coupled to the driver circuitry.

5. The antenna system of claim 1, further comprising an access point coupled to the driver circuitry.

6. The antenna system of claim 1, further comprising a laptop computer coupled to the driver circuitry.

7. The antenna system of claim 1, further comprising a mobile device coupled to the driver circuitry.

8. The antenna system of claim 1, wherein the dual polarization antenna is a first dual polarization antenna, wherein the antenna system includes a second dual polarization antenna coupled to the driver circuitry, wherein the first dual polarization antenna and the second dual polarization antenna are a phased array system to generate two independently scanned beams for both transmission and reception.

9. A non-transitory computer readable medium having instructions which, if executed by a processor, cause the processor to perform a method of operating a multiple input multiple output ("MIMO") antenna system, the instructions comprising:
provide horizontally polarized signals through a dual polarization antenna using a first radio frequency ("RF") path that is positioned between a transceiver and the dual polarization antenna; and
provide vertically polarized signals through the dual polarization antenna using a second RF path that is positioned between the transceiver and the dual polarization antenna,
wherein the horizontally polarized signals and the vertically polarized signals are provided to enable MEM operations through the dual polarization antenna,
wherein dual polarization antenna comprises first and second co-located antenna elements, the first co-located antenna element configured to transmit and receive the horizontally polarized signals, the second co-located antenna element configured to transmit and receive the vertically polarized signals, the first and second co-located antenna elements positioned without spatial separation therebetween,
wherein the horizontally polarized signals and the vertically polarized signals comprise millimeter-wave frequencies, and
wherein the first and second RF paths are electromagnetically isolated at the millimeter-wave frequencies.

10. The non-transitory computer readable medium of claim 9, wherein the dual polarization antenna concurrently transmits the horizontally polarized signals and the vertically polarized signals.

11. The non-transitory computer readable medium of claim 9, wherein the horizontally polarized signals and the vertically polarized signals are orthogonal to each other.

12. The non-transitory computer readable medium of claim 9, wherein the instructions further comprise transmit the horizontally polarized signals and the vertically polarized signals from a wireless station coupled to the transceiver.

13. The non-transitory computer readable medium of claim 9, wherein the instructions further comprise transmit the horizontally polarized signals and the vertically polarized signals from an access point coupled to the transceiver.

14. The non-transitory computer readable medium of claim 9, wherein the instructions further comprise transmit the horizontally polarized signals and the vertically polarized signals from a laptop computer coupled to the transceiver.

15. A wireless system; comprising:
a baseband integrated circuit to process baseband signals;
a dual polarization antenna comprising first and second co-located antenna elements configured to transmit and receive horizontally polarized signals and vertically polarized signals, the first co-located antenna element configured to transmit and receive the horizontally polarized signals, the second co-located antenna element configured to transmit and receive the vertically polarized signals, the first and second co-located antenna elements positioned without spatial separation therebetween;
a transceiver coupled between the baseband integrated circuit and the dual polarization antenna to transmit and receive the horizontally polarized signals and the vertically polarized signals between the transceiver and the dual polarization antenna;
a first radio frequency ("RF") path between the transceiver and the dual polarization antenna to transmit and receive the vertically polarized signals between the transceiver and the second co-located antenna element; and
a second RF path between the transceiver and the dual polarization antenna to transmit and receive the horizontally polarized signals between the transceiver and the first co-located antenna element,
wherein the horizontally polarized signals and the vertically polarized signals comprise millimeter-wave frequencies, and
wherein the first and second RF paths are electromagnetically isolated at the millimeter-wave frequencies.

16. The wireless system of claim 15, wherein the dual polarization antenna is to concurrently transmit the horizontally polarized signals and the vertically polarized signals.

17. The wireless system of claim 15, wherein a frequency of the baseband signals is 2 GHz or less, wherein a frequency of the horizontally polarized signals and of the vertically polarized signals is a millimeter-wave frequency of 57 GHz or greater.

18. The wireless system of claim 15, wherein the transceiver phase shifts the horizontally polarized signals and the vertically polarized signals.

* * * * *